(12) United States Patent
Nosaka

(10) Patent No.: US 7,389,542 B2
(45) Date of Patent: Jun. 17, 2008

(54) AUTHENTICATION SYSTEM HAVING A SEMICONDUCTOR DEVICE CONTAINING DATA WHICH ARE DIFFICULT TO ANALYZE THROUGH ILLEGITIMATE ACCESS, AND SEMICONDUCTOR DEVICE THEREFOR

(75) Inventor: Takeshi Nosaka, Kyoto (JP)

(73) Assignee: Rohm Co., Inc., Kyoto (JP)

( * ) Notice: Subject to any disclaimer, the term of this patent is extended or adjusted under 35 U.S.C. 154(b) by 952 days.

(21) Appl. No.: 10/246,226

(22) Filed: Sep. 18, 2002

(65) Prior Publication Data

US 2003/0065939 A1 Apr. 3, 2003

(30) Foreign Application Priority Data

Sep. 28, 2001 (JP) ............... 2001-299695

(51) Int. Cl.
*H04L 9/10* (2006.01)
*G06F 21/20* (2006.01)
(52) U.S. Cl. .................. 726/28; 726/5; 726/20; 713/193; 713/186; 713/182; 713/185; 713/184
(58) Field of Classification Search ............... 713/194; 726/28, 2; 438/106
See application file for complete search history.

(56) References Cited

U.S. PATENT DOCUMENTS

| | | | | | |
|---|---|---|---|---|---|
| 5,828,753 | A | * | 10/1998 | Davis | 713/189 |
| 5,903,908 | A | * | 5/1999 | Singh et al. | 711/122 |
| 6,151,678 | A | * | 11/2000 | Davis | 726/35 |
| 6,268,796 | B1 | * | 7/2001 | Gnadinger et al. | 340/572.2 |
| 6,630,744 | B2 | * | 10/2003 | Tsuda | 257/777 |
| 2001/0025342 | A1 | * | 9/2001 | Uchida | 713/186 |
| 2003/0001286 | A1 | * | 1/2003 | Kajiwara et al. | 257/778 |

\* cited by examiner

*Primary Examiner*—Ayaz Sheikh
*Assistant Examiner*—Saoussen Besrour
(74) *Attorney, Agent, or Firm*—Hogan & Hartson LLP

(57) ABSTRACT

A semiconductor device is composed of a first IC chip having a data processing function and a second IC chip having a non-volatile memory for storing confidential reference data. Both of the IC chips are provided with connection pads on the facing sides of the two chips, so that they can be bonded in a chip-on-chip configuration. Each of the connection pads of the second IC chip is located at the position of a corresponding connection pad of the first IC chip. An externally input data is compared with the reference data for verification. The input data is authenticated based on the result of the verification.

2 Claims, 10 Drawing Sheets

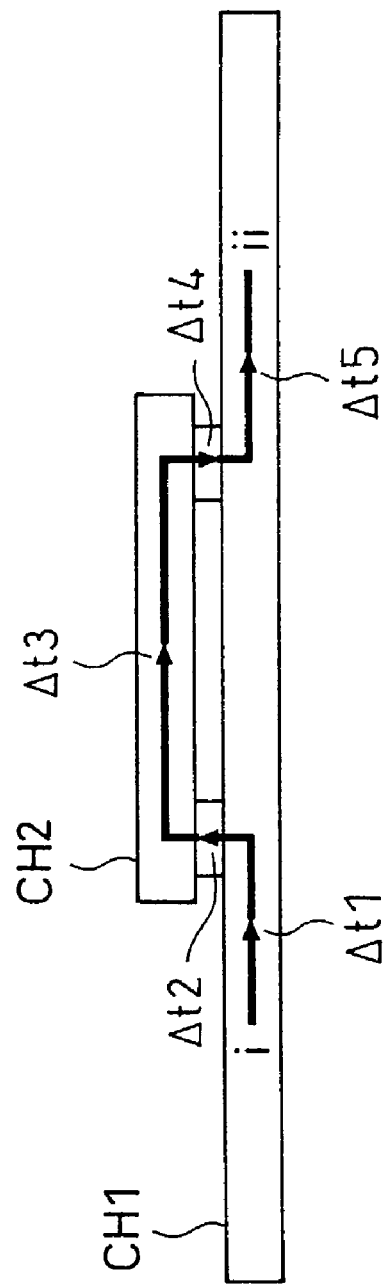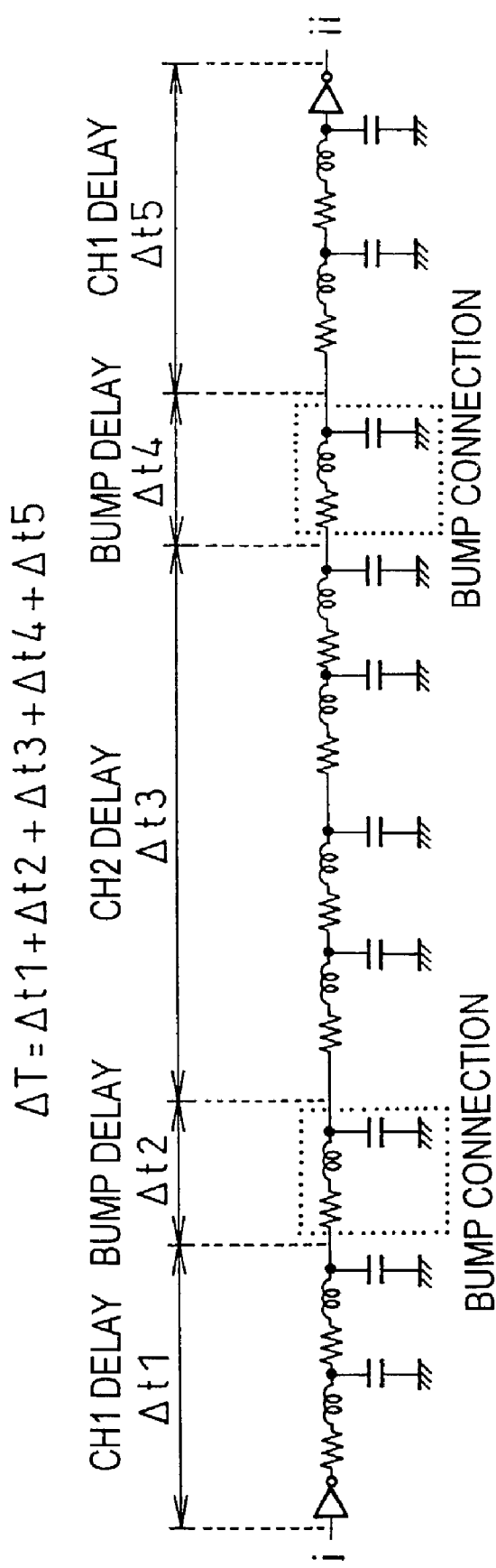
FIG. 9 (a)
FIG. 9 (b)
$\Delta T = \Delta t1 + \Delta t2 + \Delta t3 + \Delta t4 + \Delta t5$

AUTHENTICATION SYSTEM HAVING A SEMICONDUCTOR DEVICE CONTAINING DATA WHICH ARE DIFFICULT TO ANALYZE THROUGH ILLEGITIMATE ACCESS, AND SEMICONDUCTOR DEVICE THEREFOR

FIELD OF THE INVENTION

The invention relates to an authentication system requiring high-security for use in electronic commerce, data encryption, and fingerprint recognition, and to a semiconductor device useful in such high-security authentication system.

BACKGROUND OF THE INVENTION

A variety of authentication systems has been implemented. Such authentication systems have become increasingly important with the prolificacy of IT technologies in society, and with growing need for high-level security in social activities involving IT technologies.

FIG. 1 illustrates a semiconductor unit used in conventional authentication systems. This semiconductor unit comprises a semiconductor device 11 including a first IC chip CH1 having data processing functions, all packaged in a plastic mold, and a semiconductor device 12 including a second IC chip CH2 which contains confidential data like personal code, fingerprint data, and an encryption key, all packaged in a plastic mold. These semiconductor devices 11 and 12 are electrically connected by connecting the lead pins L1 of the semiconductor device 11 with the corresponding lead pins L2 of the semiconductor device 12 using a printed pattern W1.

In this way the semiconductor unit has a two-package structure and data are transferred between them through the printed pattern W1. This type of semiconductor units have a drawback that the confidential data may be easily retrieved from the second IC hip CH2 of the semiconductor device 12 for illegitimate analysis by use of a memory accessing technology. For example, the data can be analyzed by detecting signals passing through the lead pins L1 and L2 across the printed pattern W1.

Improvements have been made by the inventor of the present invention to circumvent the problem pertinent to the conventional authentication system as shown in FIG. 1. In one improvement, a semiconductor device 13 for use in authentication system includes an IC chip having an embedded memory as shown in FIG. 2, and in another improvement a semiconductor has a multi-chip structure 14 as shown in FIG. 3.

The semiconductor device 13 shown in FIG. 2 has a non-volatile memory MA, as indicated by a broken line, for storing confidential data embedded in an IC chip CH1 that has data processing function. The semiconductor device 13 is packaged by sealing it with a molding resin.

The semiconductor device 14 shown in FIG. 3 includes a first IC chip CH1 having a data processing function, and a second IC chip CH2 having a memory for storing confidential data. These IC chips are electrically connected together by connecting the corresponding connection pads P1 and P2 of the respective IC chips by means of bonding wires W2. The entire device is then packaged by sealing it with a molding resin. L1 represents lead pins of the package.

As such, the confidential data stored in the non-volatile memory MA and in the second IC chip CH2 of these semiconductor devices 13 and 14 are not accessible for illegitimate analysis. However, one can open the resin package if he has a technique to open a molded package and can probe the lead wires and/or pads connected to the non-volatile memory MA or the IC chip to read the confidential data. After all therefore, like any other conventional semiconductors as shown in FIG. 1, even improved semiconductor devices 13 and 14 can be attacked by illegitimate accesses for the confidential data, although the data are stored in the sealed non-volatile memory MA and/or sealed IC chip CH2.

SUMMARY OF THE INVENTION

It is therefore an object of the present invention to provide authentication means having a semiconductor device storing confidential data that cannot be illegitimately accessed or easily analyzed.

It is another object of the present invention to provide a semiconductor device for use in authentication systems, the semiconductor device having a structure that makes it difficult to illegitimately access reference data stored therein.

In one aspect of the invention, there is provided an authentication system, comprising: a semiconductor device which has a first IC chip having on one side thereof connection pads and having a data processing function, and a second IC chip including a non-volatile memory for storing reference data and having on one side thereof connection pads, the second IC chip bonded on the first IC chip in a chip-on-chip configuration such that the connection pads of the second IC chip are coupled to corresponding connection pads of the first IC chip; and a control unit connectable with said semiconductor device, wherein the authentication system is adapted to compare externally input data with the reference data to verify the externally input data, and authenticate the externally input data based on the result of the verification.

In another aspect of the invention, there is provided a semiconductor device, comprising: a first IC chip having a data processing function and having connection pads on one side of the first chip; and a second IC chip including a non-volatile memory for storing reference data and having on one side thereof connection pads, the second IC chip bonded on the first IC chip in a chip-on-chip configuration such that the connection pads of the second IC chip are coupled to corresponding connection pads of the first IC chip.

BRIEF DESCRIPTION OF THE DRAWINGS

FIG. 9(*a*) shows propagation of a signal along a path in the semiconductor device of the invention, and FIG. 9(*b*) shows delay times at various points of the path.

DETAILED DESCRIPTION OF THE PREFERRED EMBODIMENT

Preferred embodiments of an authentication system and a semiconductor device therefor according to the invention will now be described with reference to the accompanying drawings.

Figure 4:
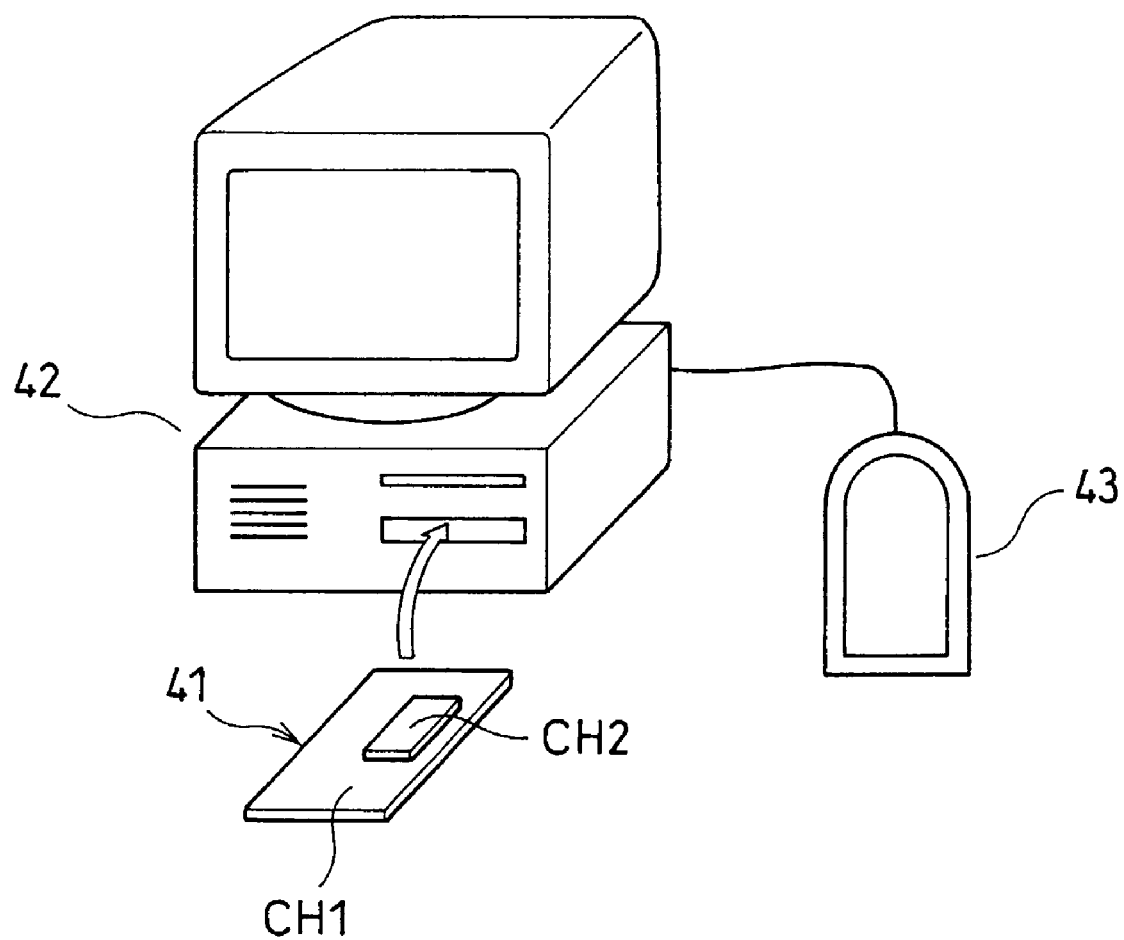
FIG. 4 is a schematic perspective view of a fingerprint verification system according to the invention.
Figure 5:
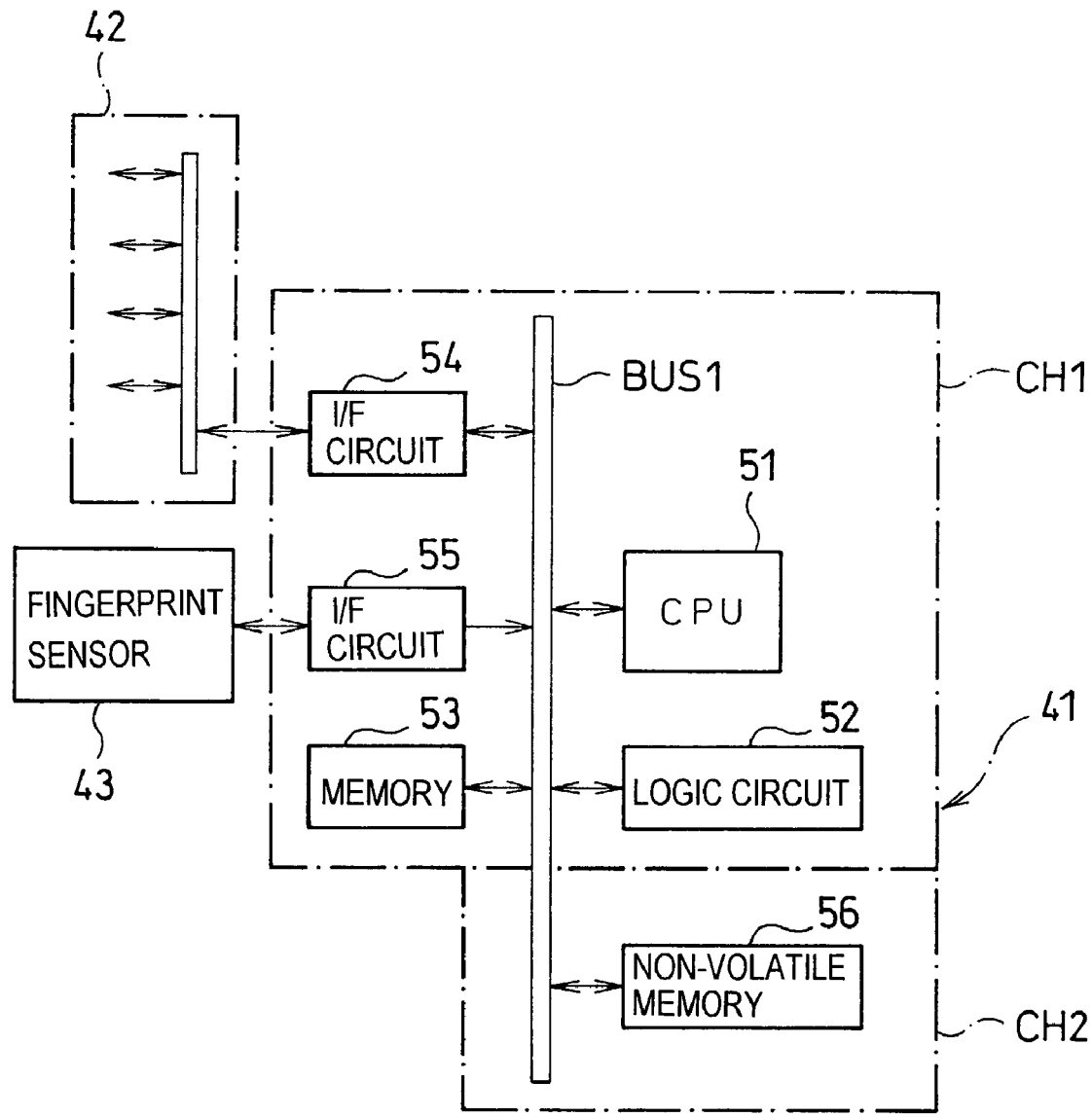
FIG. 5 is a block diagram of a fingerprint verification system according to the invention.
Figure 6:
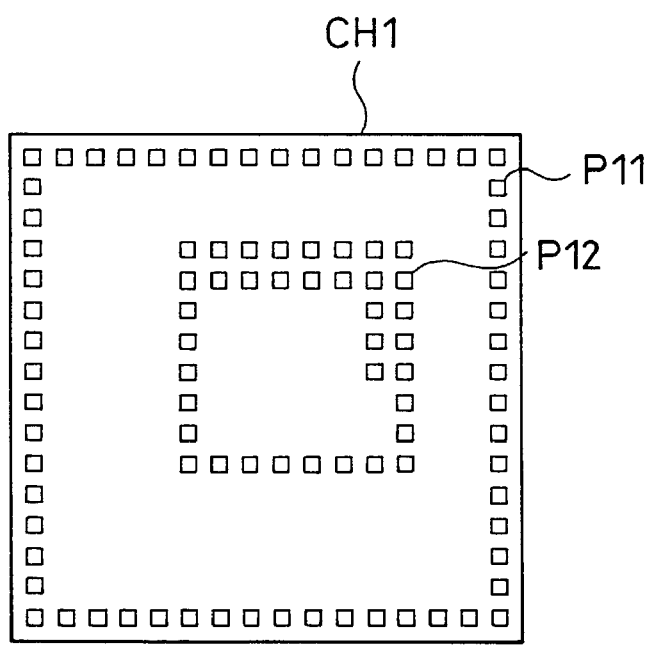
FIGS. 6(a) and 6(b) show two chips of a semiconductor device prior to COC bonding in accordance with the invention.
Figure 6:
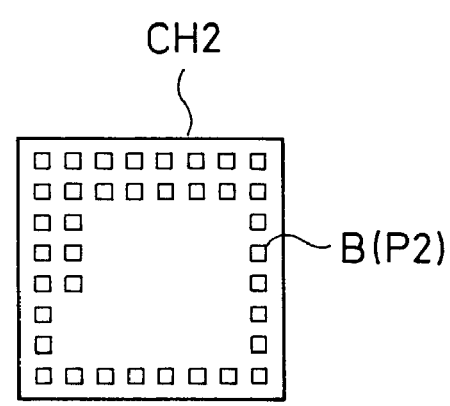
Figure 7:
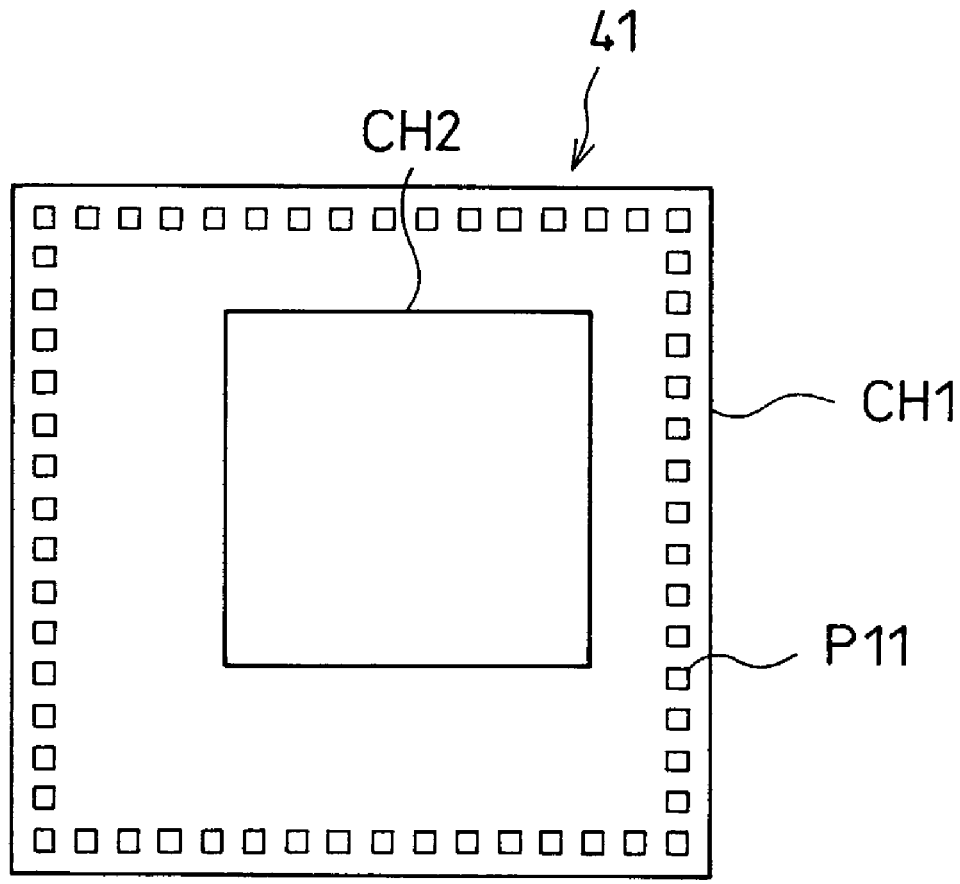
FIGS. 7(a) and 7(b) are plan and side views of a semiconductor device with the two chips bonded together in COC configuration in accordance with the invention.
Figure 7:
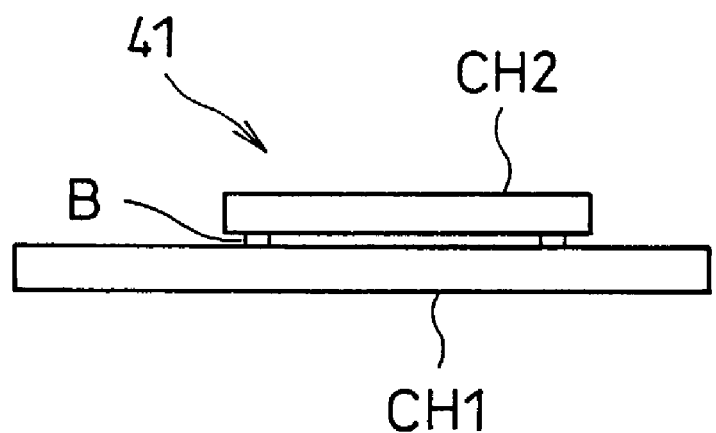
Figure 8:
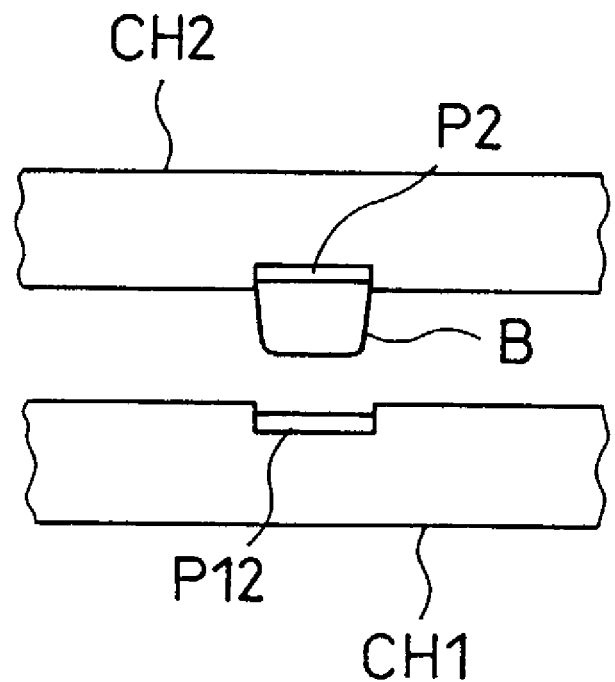
FIGS. 8(*a*) and 8(*b*) show in partial enlarged cross section the bump connection of the two chips of a semiconductor device according to the invention, before and after bonding the two chips in COC configuration.
Figure 8:
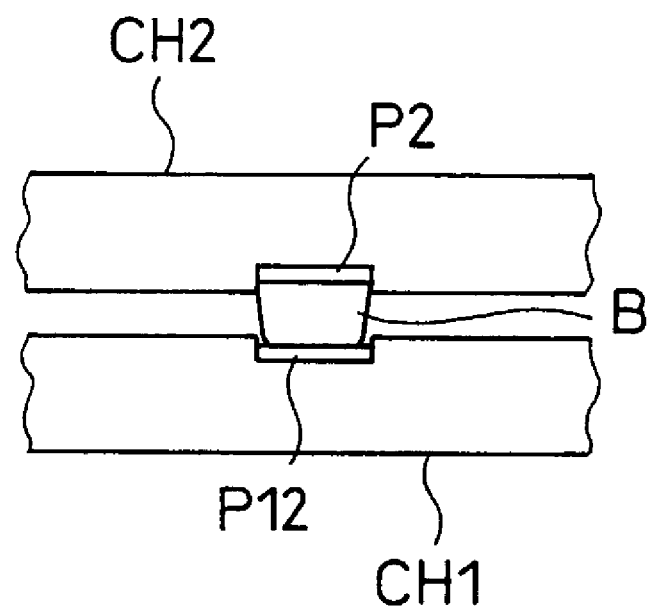

Referring to FIG. 4, there is shown an embodiment of an authentication system of the invention in the form of a fingerprint verification system. FIG. 5 is a block diagram of the fingerprint verification system. FIGS. 6(*a*) and 6(*b*) show two chips of a semiconductor device for use in an authentication system, prior to chip-on-chip (COC) bonding. FIGS. 7(*a*) and (*b*) show a plan view and a side elevation of the semiconductor device having COC structure. FIGS. 8(*a*) and (*b*) show an enlarged view of a bump (or protruding electrode) before and after the COC bonding.

Although the invention will be described below with reference to a preferred embodiment of a fingerprint verification system, the inventive authentication system is not limited to this embodiment, but may be applied to a variety of applications in different fields, including, for example, a scramble decoder system for use in satellite broadcast, an authentication system for electronic commerce, an IC card and authentication system therefor, a hard key system for game software, a hard key system for computer software, a computer user authentication system, a personnel coding system for security management of a building, an RF-ID verification system, a Bluetooth (short-distance wireless communications standard) personnel code verification system, a security system for transportation means such as automobiles, and an electronic key system for a safe.

In the fingerprint verification system as shown in FIGS. 4 and 5, a semiconductor device 41 comprises a first IC chip CH1 and a second IC chip CH2. The first IC chip CH1 includes a data processing functionality comprising a CPU 51, a logic circuit 52, a memory 53, first and second I/F circuits 54, 55. The second IC chip CH2 has a non-volatile memory 56 for storing fingerprint data registered as confidential reference data. The first IC chip CH1 is mostly formed of fine CMOS elements. The first IC chip CH1 and the second IC chip CH2 are integrally coupled together in COC connection via bumps.

Although not shown in FIG. 4 or 5, a primary control unit 42 of the fingerprint verification system includes a main CPU, a program ROM, a work memory RAM, and a monitor. The semiconductor device 41 is inserted in a slot of the primary control unit 42 in the direction indicated by a broken arrow as shown in FIG. 4 to bring the primary control unit 42 coupled with the semiconductor device 41. A fingerprint sensor 43 is connected to the primary control unit 42 via the I/F interfaces 54 and 55.

In the fingerprint system, confidential reference data, which are presently fingerprint data, are registered in a non-volatile memory 56 of second IC chip CH2. Fingerprint of a person touching the fingerprint sensor 43 is recognized by the fingerprint sensor 43 and fed to the semiconductor device 41. The fingerprint data fed to the semiconductor device 41 of the first IC chip CH1 are verified, i.e. determined if the data coincide with the reference fingerprint data. As a result of the verification, authentication is made, which is sent to the primary control unit 42 for further processing to display it on a display, announce it vocally, or print it out as needed. In accordance with the invention, the reliability of the fingerprint verification system is secured by securing the secrecy of the reference fingerprint data registered in the non-volatile memory 56 of the second IC chip CH2.

It should be understood that the coincidence between the sampled fingerprint data and the registered reference fingerprint data may alternatively be determined by the primary control unit 42. In that instance, in order to verify and authenticate the fingerprint data sampled by the fingerprint sensor 43, the data are fed to the primary control unit 42 for comparison with the registered fingerprint data retrieved from the semiconductor device 41 using internal processing means of the primary control unit 42.

In the example shown herein, the semiconductor device 41 is composed of: a first IC chip CH1 having on one side thereof connection pads and a data processing function; and a second IC chip CH2 having on one side thereof connection pads and a non-volatile memory 56 such that when the two chips are bonded together via bumps, the connection pads of the second IC chip CH2 are connected with corresponding connection pads of the first IC chip CH1 in one-to-one correspondence, i.e. coupled together to form a COC structure formed on the surfaces of the respective chips.

Features of the COC structure of the semiconductor device 41 composed of the first IC chip CH1 and the second IC chip CH2 will be described in more detail below with reference to FIGS. 6-8.

As shown in FIG. 6(*a*), the first IC chip CH1 has peripheral connection pads P11 and central connection pads P12 on one face thereof. Each of the central connection pads P12 is located and formed to correspond to a respective connection pad of the second IC chip CH2.

FIG. 6(*b*) shows a face of the second IC chip CH2 having thereon connection pads P2, each provided with a bump B.

In coupling the two chips together, the second IC chip CH2 is turned over and placed on the first IC chip such that each of the pads P2 of the second IC chip CH2 rests on the corresponding connection pad P12 of the first IC chip CH1, via a bump B as shown in FIG. 8(*a*). Bumps B can be gold (Au). The connection pads P11, P12, and P2 may be formed of aluminum, but a thin gold layer may be provided on each of the connection pads P12.

The two chips, now facing each other, are heated under a given pressure (e.g. 2 g/bump at 350° C.). As a result, the connection pads P12 and P2 are securely bonded with the bumps B, as shown in FIG. 8(*b*), thereby establishing firm electrical and mechanical coupling between the two IC chips CH1 and CH2, as shown in FIGS. 7(*a*) and (*b*).

Although it is not shown in FIG. 7, the connection pads 11 are connected to an outer lead frame by a known wire-bonding technique, and sealed in a molding resin.

In the semiconductor device for use with an authentication system, the second IC chip CH2 is securely coupled to the first IC chip CH1 by means of the bumps B in the COC configuration. Hence, if the sealing resin is removed by a resin removing technique, the connection pads P2 of the second IC chip CH2 (and the connection pads P12 as well) cannot be spaced apart to probe them. Hence, accessing, and hence analysis of, the reference data is difficult to do. Particularly, when the connection pads P12 and P2 of the IC1 and IC2, respectively, are arranged in multiple rows and/or columns as shown in FIG. 6, probing the inner connection pads is yet more difficult.

The first and the second IC chips CH1 and CH2 forming the COC structure may be forced to disintegrate apart with a might. In that event, however, they will be cracked, ruptured, or broken. Or else bonding wires and/or connection pads will be severely damaged, since the connection pads P12 and P2 are firmly bonded mechanically by the bumps B. In any case, the IC chips themselves are destroyed, so that illegitimate access to the confidential reference data is prevented.

In accordance with a second embodiment of the invention, confidential reference data may be split in pieces as described below. In the first embodiment described above in connection with FIGS. 4-8, reference data are stored in a non-volatile memory of the second IC chip CH2.

Instead, the reference data may be split into first and second pieces to be separately stored in the first and the second IC chips.

Figure 1:
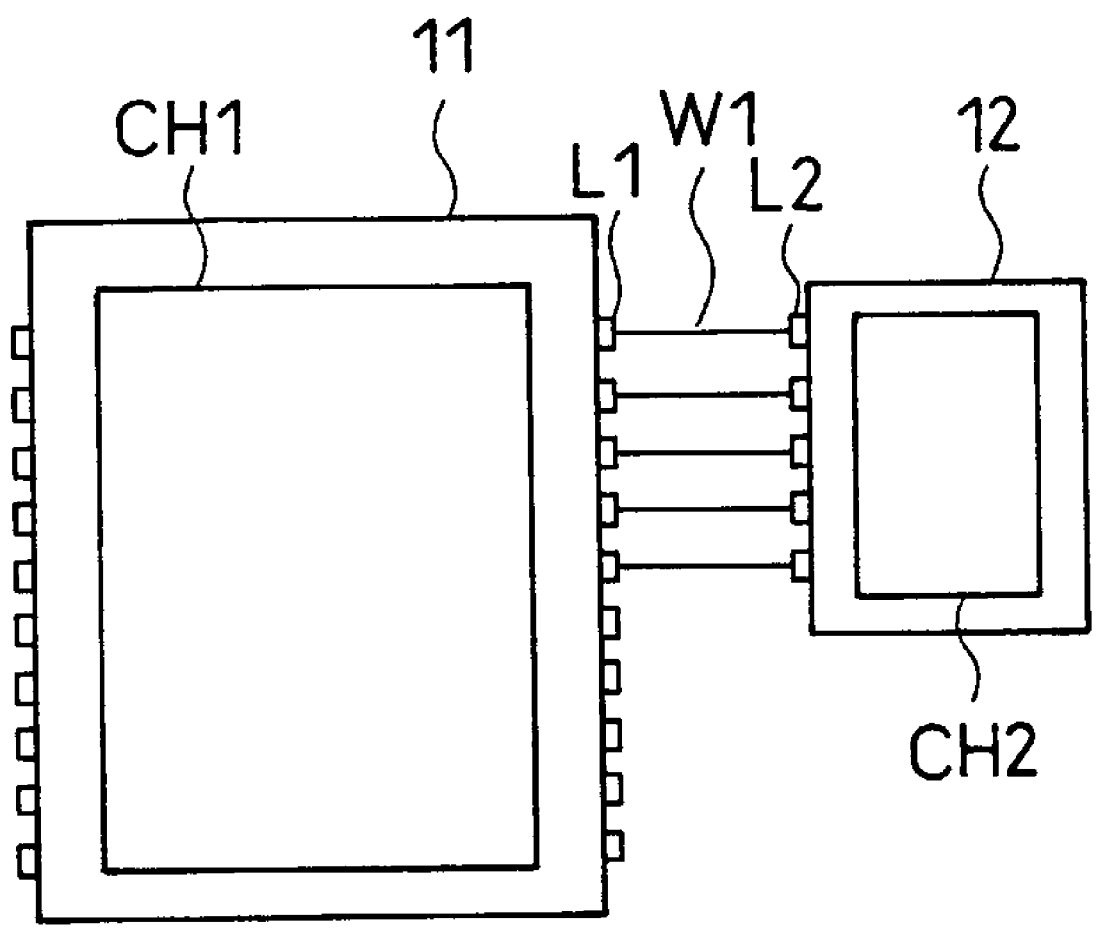
FIG. 1 is a schematic diagram of a semiconductor device used in conventional authentication system.
Figure 2:
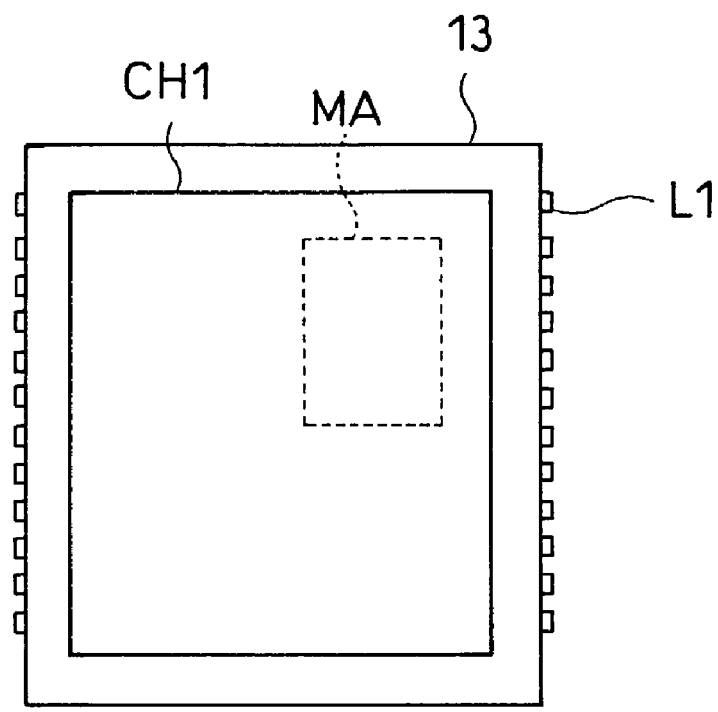
FIG. 2 is a schematic diagram of a semiconductor device including an IC chip having an embedded memory.
Figure 3:
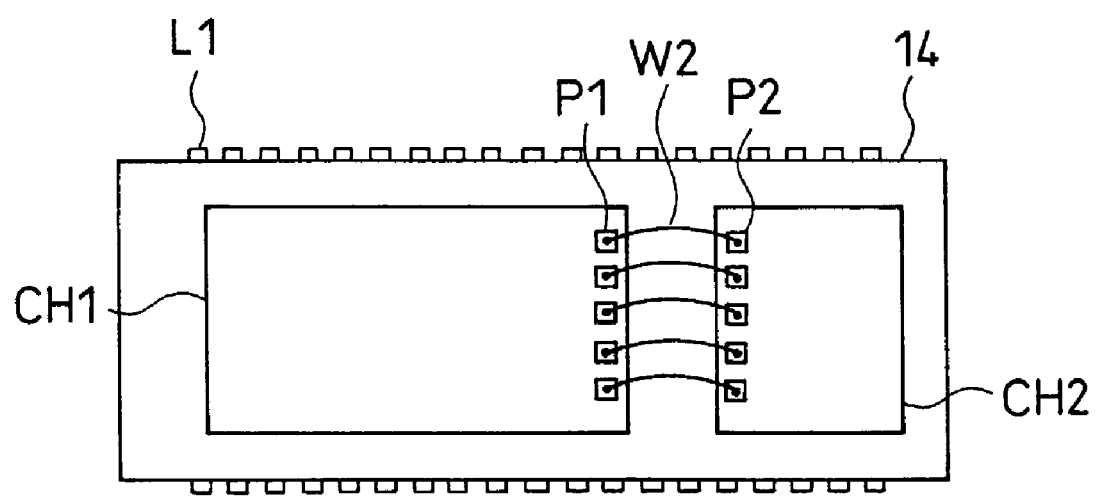
FIG. 3 is a schematic diagram of a semiconductor device having a multi-chip structure.

In this instance, the first IC chip CH1 is provided with a memory for storing a separate piece of the reference data, along with the control function. The memory is preferably a non-volatile memory embedded in the first IC chip CH1 like the non-volatile memory MA shown in FIG. 2.

One way to split the reference data is based on addition/subtraction operation on data. As a simple example of addition/subtraction operation, consider a reference data {816, 177}. The data may be split into, for example, {272, 059} to be stored in the first IC chip CH1 and {544 and 118} to be stored in the second IC chip CH2, so that, when added together, they make the original reference data. The splitting of data can be done using any of four arithmetic operations: addition, subtraction, multiplication, and division.

In the second embodiment described above, if the first IC chip CH1 is physically separated from the second IC chip CH2 safely (i.e. without breaking the chips), the reference data will remain split in the two separate IC chips, so that the analysis of the data is harder yet.

Figure 10:
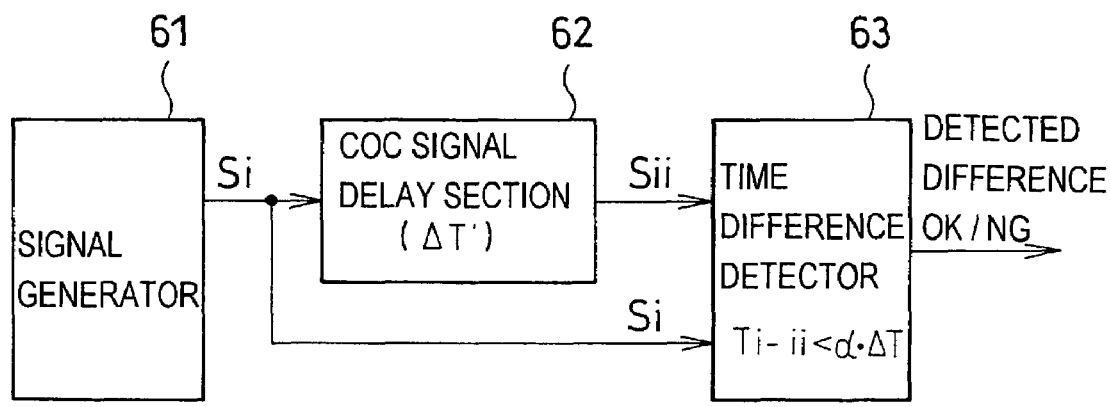
FIG. 10 is a block diagram representation of a delay time monitoring function of a semiconductor device according to the invention.

FIGS. 9 and 10 show a third embodiment of the invention. In this example, in order to prevent or hinder illegitimate access to the reference data, a delay time required for a signal to propagate through a given path is monitored to detect illegitimate access to the reference data.

As seen in FIGS. 9(a) and 9(b), it takes a certain propagation time: (referred to as delay time) for a signal generated at a point (i) in the first IC chip CH1 to go through the entire path to reach another point (ii) of the first IC chip CH1 via the second IC chip CH2. The total delay time ΔT is a sum of delay times counted for the respective sections of the path as shown in FIG. 9(b). In this example, ΔT is the sum of delay time Δt1 for the first section of the first IC chip CH1, delay time Δt2 across the first bump, delay time Δt3 for the section of the second IC chip CH2, delay time Δt4 across the second bump, and delay time Δt5 for the second section of the first IC chip CH1, as shown in FIG. 9(b). It is noted that semiconductor devices 41 having the same COC structure have substantially the same delay time ΔT. Further, the delay time ΔT of a device remains substantially constant after it is manufactured.

Thus, a signal generator 61 and a time difference detector 63 are provided in the first IC chip CH1 as control elements for the first IC chip CH1, as shown in FIG. 10. In this arrangement, a signal Si generated by the signal generator 61 is supplied to a COC signal delay section 62 (generating a signal Sii having a delay of ΔT') and to the time difference detector 63. The time difference detector 63 detects propagation times of the signal Si and of signal Sii that has passed the COC signal delay section 62, and determines if the difference $T_{i-ii}$ satisfies the following equation.

$$T_{i-ii} < \alpha \cdot \Delta T \quad (1)$$

where α is a known parameter and a α·ΔT represents the nominal delay time difference for the semiconductor device.

The delay time created by the COC signal delay section 62 represents the propagation time between the points (i) and (ii) of FIG. 9, which greatly depends on the bonding conditions of the bumps between the first IC chip CH1 and the second IC chip CH2.

When the first IC chip CH1 and the second IC chip CH2 together have a normal COC structure, Equation (1) above always holds. However, in the event that the second IC chip CH2 is disconnected from the first IC chip CH1 and then connected again by wires for example, the delay time ΔT' then created in the COC signal delay section 62 will become much larger than the nominal delay time α·ΔT, thereby dissatisfying Equation (1).

If invalidity of Equation (1) is detected by the time difference detector 63, then the control function of the first IC chip CH1 is enabled to stop the IC chip CH1 itself.

In the third embodiment described above, if the second IC chip CH2 is removed once from the first IC chip CH1 and reconnected again using wires for example, it is detected by delay time monitoring means (61 and 63) that the delay time exceeds the allowable delay time, thereby stopping the operations of the semiconductor device. Accordingly, illegitimate access to the reference data is in practice prevented.

Figure 11:
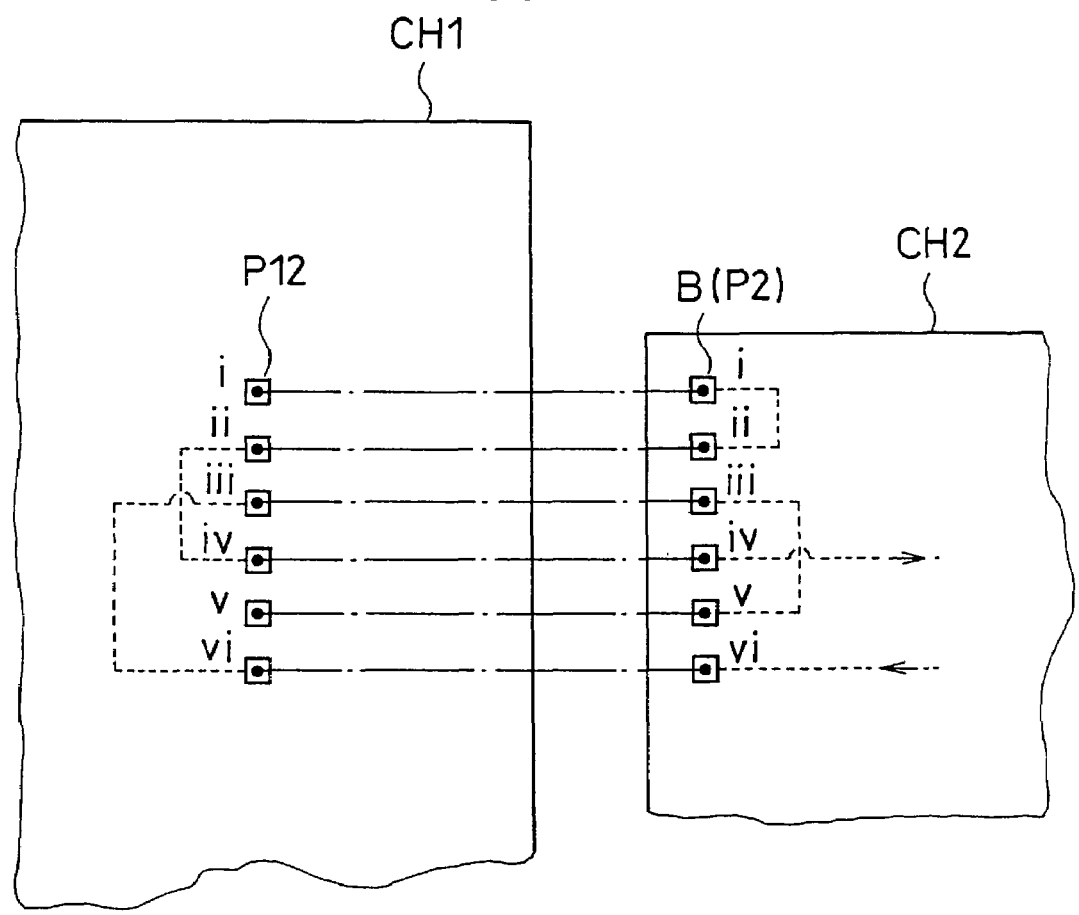
FIG. 11 shows signal paths between the two chips of the semiconductor device, having redundant bump connections according to the invention.

FIG. 11 shows a fourth embodiment of the invention. In this embodiment, in order to make the illegitimate access to the reference data more difficult, a larger number of bumps are provided between the chips than required for transfers of signals, implementing some redundant signal paths. In FIG. 11, broken lines represent internal wiring of the first IC chip CH1 and the second IC chip CH2, both covered with protective layers. Dotted lines represent connections by the bumps B.

As shown in FIG. 11, despite only two bumps are required for one signal path from the first IC chip CH1 to the second IC chip CH2 and another from the second IC chip CH2 to the first IC chip CH1, there are provided in total 6bumps (i)-(vi).

It is physically much more difficult to remove, and correctly reconnect, so many connection bumps (6 bumps in this example) between the two IC chips CH1 and CH2 as compared with the removal and reconnection of the minimum number (2) of bumps.

Moreover, if the first IC chip CH1 and the second IC chip CH2 are safely separated, it is physically difficult to reconnect them together to correctly restore the redundancy of the multiple bumps that are connected in series to make a single path. Hence, accessing the data will be difficult.

Figure 12:
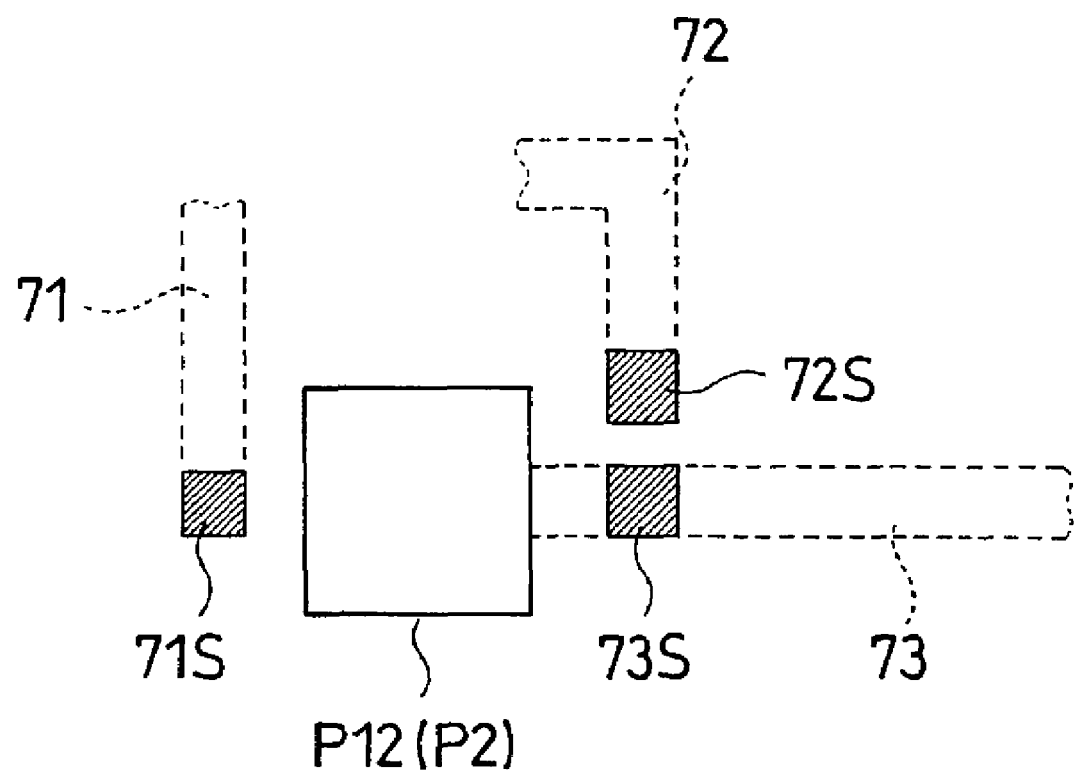
FIG. 12 shows a partial circuit pattern in the neighborhood of a connection pad, the circuit pattern having exposed portions near the connection pad according to the invention.

FIG. 12 shows a fifth embodiment of the invention, in which wiring patterns which have fixed electric potentials are disposed in the neighborhood of a connection pad P12 of the first IC chip CH1 or a connection pad P2 of the second IC chip CH2, and portions of the wiring patterns are exposed near the associated connection pads.

For example, as shown in FIG. 12, near a connection pad P12 of the first IC chip CH1 (or alternatively a connection pad P2 of the second IC chip CH2), there is provided a power supply line 71 (or alternatively a ground line) covered with a protective film. However, a portion 71S of the line 71 is exposed. The exposed portion 71S is formed by removing that portion of the protective film of the wire located as close to the connection pad as possible.

Similarly, an exposed portion of another power supply line 72 may be provided near the pad. Alternatively, the portion 73S of a lead wire 73 connected to a connection pad P12 (or P2) may be exposed in the neighborhood of a nearby power supply line 72. In addition, portions of data lines may be exposed in the same manner near one of the connection pads P12 and P2.

It is noted that these exposed portions 71S, 72S, and 73S of lead wires and the ground line disposed in the neighborhood of connection pads P12 and P2 are formed so as not to hinder the operations of the semiconductor device by accurately fabricating the wiring patterns and removing the protective films under the control of a computer while manufacturing the respective IC chips CH1, CH2 and the connection pads.

Should the first IC chip CH1 and the second IC chip CH2 be disconnected once and reconnected again by soldering them together, the solder would short-circuit the exposed portions 7IS, 72S, and 73S with the associated connection pads P12 and P2. Consequently, the connection pads P12 and P2 will be then held at the fixed potentials, thereby preventing normal operations of the chips. Thus, illegitimate accesses to the reference data will be prevented.

It will be apparent to a person of a skill in the art that more than one protective measures against illegitimate accessing described above can be employed in combination in a semiconductor device for the purpose described above. In this case, therefore, illegitimate accesses to the reference data will become more difficult, enhancing the security of the confidential data stored in the authentication system built in a semiconductor device.

What I claim is:

1. An authentication system, comprising:
   a semiconductor device having
   a first IC chip having on one side thereof connection pads and having a data processing function, and
   a second IC chip including a non-volatile memory for storing reference data and having on one side thereof connection pads, said second IC chip bonded on said first IC chip in a chip-on-chip configuration such that said connection pads of said second IC chip are coupled to corresponding connection pads of said first IC chip, wherein said chip-on-chip configuration is established via bumps provided between said connection pads; and
   a control unit, connectable with said semiconductor device, wherein
   said authentication system is adapted to compare externally input data with said reference data to verify said externally input data and authenticate said externally input data based on a result of said verification, wherein
   said first IC chip is provided with a memory such that said reference data (original reference data) stored in said non-volatile memory of said second IC chip are split into two pieces and separately stored in the respective non-volatile memories of said first and the second IC chips,
   said authentication system is integrating said two pieces of reference data to restore original reference data.

2. The authentication system according to claim 1, wherein
   said memory provided in said first IC chip is a non-volatile memory embedded in said first IC chip.

* * * * *